United States Patent
Marshall

(10) Patent No.: US 10,059,181 B2
(45) Date of Patent: Aug. 28, 2018

(54) HIGH-TECH COVER

(71) Applicant: Mark A. Marshall, Stockton, CA (US)

(72) Inventor: Mark A. Marshall, Stockton, CA (US)

( * ) Notice: Subject to any disclaimer, the term of this patent is extended or adjusted under 35 U.S.C. 154(b) by 0 days.

(21) Appl. No.: 15/591,685

(22) Filed: May 10, 2017

(65) Prior Publication Data
US 2017/0326956 A1    Nov. 16, 2017

Related U.S. Application Data

(60) Provisional application No. 62/336,685, filed on May 15, 2016.

(51) Int. Cl.
| | | |
|---|---|---|
| *B60R 25/00* | (2013.01) | |
| *B60J 7/16* | (2006.01) | |
| *B60Q 1/00* | (2006.01) | |
| *B60Q 1/22* | (2006.01) | |
| *B60Q 1/26* | (2006.01) | |
| *B60Q 1/38* | (2006.01) | |
| *B60Q 1/44* | (2006.01) | |
| *B60Q 1/46* | (2006.01) | |
| *B60R 11/04* | (2006.01) | |
| *B60R 25/10* | (2013.01) | |

(52) U.S. Cl.
CPC .......... *B60J 7/1621* (2013.01); *B60Q 1/0035* (2013.01); *B60Q 1/22* (2013.01); *B60Q 1/2619* (2013.01); *B60Q 1/38* (2013.01); *B60Q 1/44* (2013.01); *B60Q 1/46* (2013.01); *B60R 11/04* (2013.01); *B60R 25/1001* (2013.01)

(58) Field of Classification Search
CPC ........ B60J 7/1621; B60Q 1/0035; B60Q 1/22; B60Q 1/2619; B60Q 1/44; B60Q 1/46; B60Q 1/38; B60R 25/1001
USPC ........................... 180/287; 296/100.06, 37.6
See application file for complete search history.

(56) References Cited

U.S. PATENT DOCUMENTS

| | | | | |
|---|---|---|---|---|
| 5,366,266 | A * | 11/1994 | Harbison | B60J 7/1614 16/364 |
| 5,964,492 | A * | 10/1999 | Lyon | B60R 9/00 224/404 |
| 6,092,852 | A * | 7/2000 | Lawrence | B60R 9/00 220/841 |
| 6,227,602 | B1 * | 5/2001 | Bogard | B60J 7/141 296/100.06 |
| 6,234,559 | B1 * | 5/2001 | Block | B60J 7/1621 296/100.06 |
| 2004/0195857 | A1 * | 10/2004 | Chverchko | B60J 7/1621 296/100.07 |
| 2006/0244283 | A1 * | 11/2006 | Thacker | B60J 7/1614 296/100.06 |
| 2009/0102227 | A1 * | 4/2009 | Herndon | B62D 35/001 296/100.06 |
| 2013/0015678 | A1 * | 1/2013 | Williamson | B60J 7/1607 296/100.09 |
| 2016/0200376 | A1 * | 7/2016 | Kerr, III | B60P 7/02 296/100.07 |

* cited by examiner

Primary Examiner — Toan C To
(74) Attorney, Agent, or Firm — William C. Milks, III

(57) ABSTRACT

A high-tech pickup truck bed cover is disclosed. The cover provides a protective covering for a pickup truck's cargo bed and preferably includes safety lighting and a backup camera.

7 Claims, 3 Drawing Sheets

HIGH-TECH COVER

CROSS-REFERENCE TO RELATED PATENT APPLICATION

This application claims the benefit of U.S. Provisional Patent Application No. 62/336,685 filed on May 15, 2016, entitled HIGH-TECH COVER, the disclosure of which is hereby incorporated herein in its entirety by this reference.

BACKGROUND OF THE INVENTION

1. Field of the Invention

The present invention relates to truck bed covers and, more particularly, to covers for pickup truck beds. Specifically, various examples in accordance with the present invention provide an attractively-styled rigid cover for the bed of a pickup truck, which preferably incorporates rear-facing indicator and backup safety lighting and a backup camera.

2. Description of the Prior Art

Known pickup truck bed covers simply provide a hinged cover for the bed of the truck. The hinge for the cover is typically located at the cab end of the bed of the pickup truck.

SUMMARY OF THE INVENTION

A rigid pickup truck bed cover in accordance with various examples of the present invention provides protection for the contents of a pickup truck bed as well as additional safety lighting. The safety lighting may comprise, for example, right and left turn signal lights and hazard lights, backup lights, and/or a brake light(s). The cover may also comprise a backup camera. The rigid pickup truck bed cover may be hinged at the tailgate end of the pickup truck bed to allow oversized cargo to be transported for added versatility and convenience. Alternatively, the cover may be removably installed on the bed of the pickup truck.

The foregoing and other objects, features, and advantages of the present invention will become more readily apparent from the following detailed description of various example embodiments, which proceeds with reference to the accompanying drawing.

BRIEF DESCRIPTION OF THE DRAWING

The various example embodiments of the present invention will be described in conjunction with the accompanying figures of the drawing to facilitate an understanding of the present invention. In the drawing.

DETAILED DESCRIPTION OF THE EXAMPLE EMBODIMENTS

One example embodiment of the pickup truck bed cover in accordance with the present invention, generally indicated by the numeral 10, is shown in FIGS. 1-4. The cover 10 is preferably rectangular and may measure approximately 3 to 5 inches tall, 4 to 8 feet long, and 4 to 5 feet wide to cover the bed of a pickup truck 12.

Figure 1:
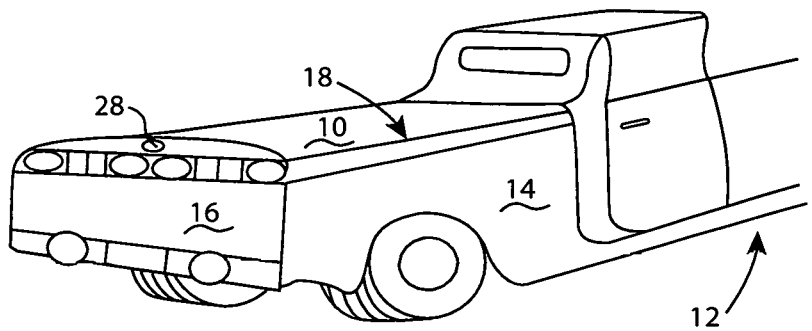
FIG. 1 illustrates a perspective view of an example embodiment of a pickup truck bed cover in accordance with the present invention installed on a pickup truck.
Figure 2:
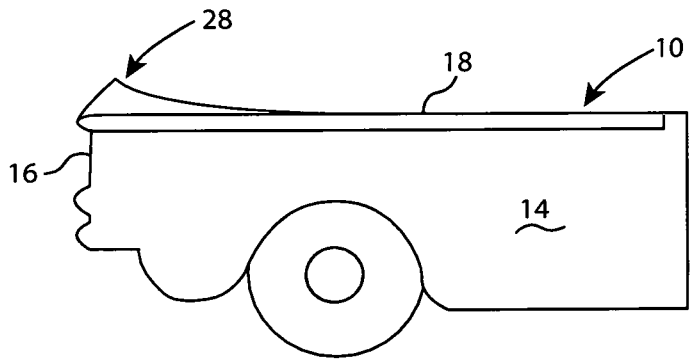
FIG. 2 illustrates a side view of the cover shown in FIG. 1 installed on the pickup truck.
Figure 4:
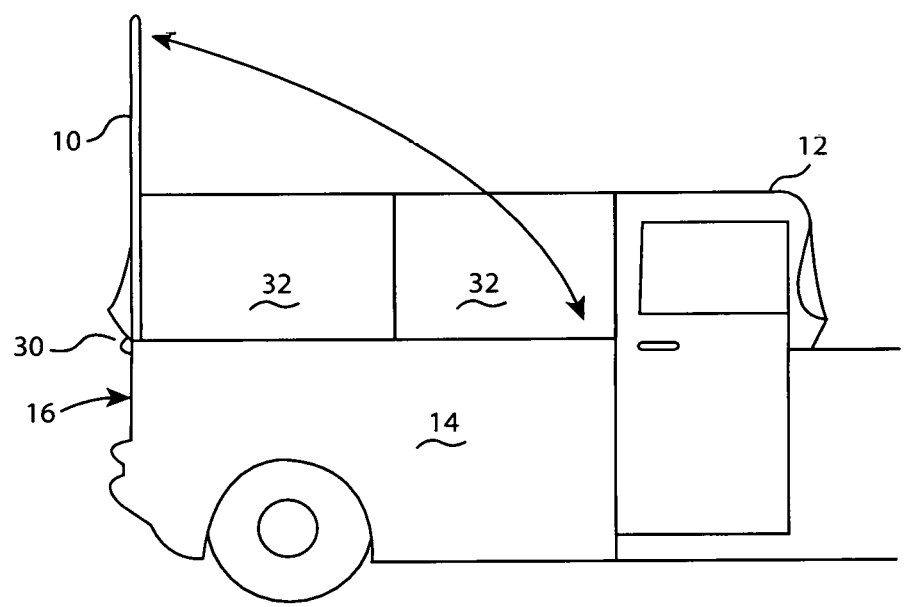
FIG. 4 illustrates an example embodiment of the cover shown in FIG. 1 in the open position to allow oversized cargo to be transported.

The cover 10 may be constructed of plastic, fiberglass, or aluminum to provide a rigid cover. As shown in FIGS. 1, 2, and 4, the cover 10 is preferably attractively styled to fit over the walls 14 and raised tailgate 16 of the pickup truck 12. In the closed position, the cover 10 conceals and protects contents transported inside the bed of the pickup truck 12.

As shown in FIGS. 1 and 2, the cover 10 preferably has a slightly arched shape 18 that is visually appealing. The cover 10 may be offered in different colors to match or compliment the painted finishes of the pickup truck 12. The cover 10 may be used in both private and commercial pickup buck applications.

Figure 3:
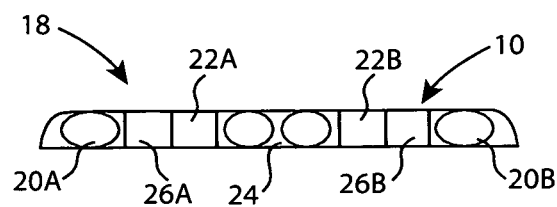
FIG. 3 illustrates a rear elevational view of safety lighting incorporated at the tailgate end of the cover shown in FIG. 1.

Unlike known covers, the cover 10 further comprises safety lighting. As shown in FIG. 3, the tailgate end of the cover 10 preferably comprises amber turn signal lights 20A and 20B at the left and right sides, left and right hazard lights 22A and 22B, as well as a center red brake light(s) 24. The cover 10 may also comprise additional left and right backup lights 26A and 26B. These lights are preferably wired to the circuitry of the existing rear pickup truck lights utilizing, for example, a trailer hitch wiring harness commercially available from Hopkins Manufacturing Corporation located in Emporia, Kans., to provide elevated rear lighting for added safety. As shown in FIGS. 1 and 2, the cover 10 may also comprise a backup camera 28 which may be mounted to the cover.

As shown in FIG. 4, the cover 10 may be hingedly mounted to the tailgate end of the bed of the pickup truck 12 by hinges 30 mounted to the walls 14 of the bed of the pickup truck. Additionally, the cover 10 may comprise an alarm (not shown) to indicate unauthorized access to the bed of the pickup truck 12. The cover 10 shown in FIG. 4 is hinged at the tailgate end of the pickup truck bed to allow oversized cargo 32 to be transported when the cover is in the open position for added versatility and convenience.

Figure 5:
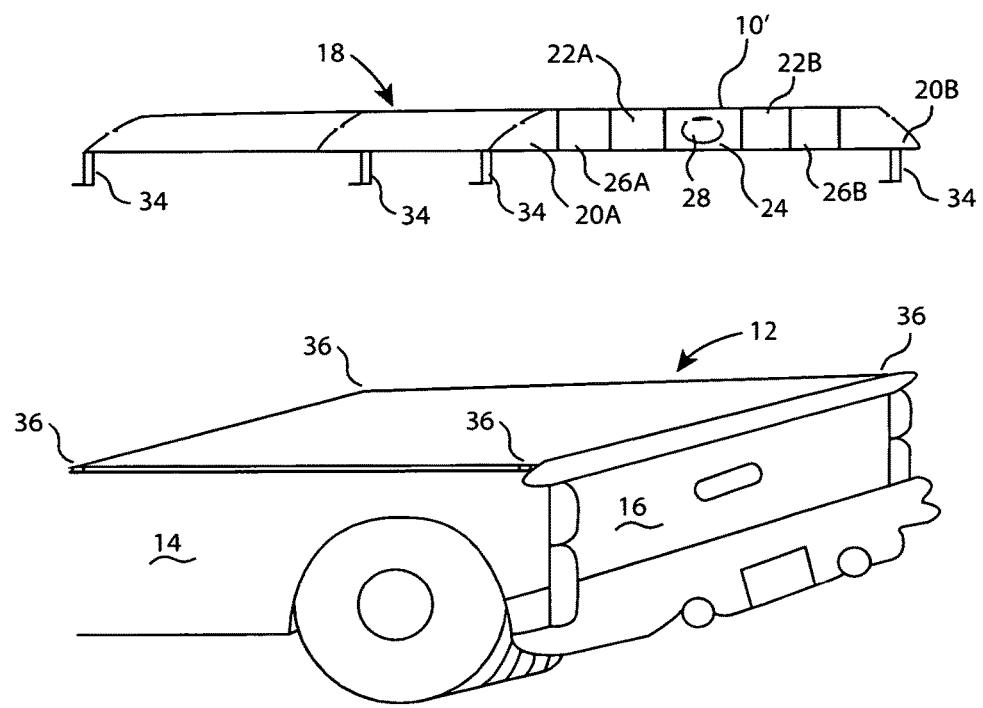
FIG. 5 illustrates an alternative example embodiment of a pickup truck bed cover in accordance with the present invention for installation on a pickup truck.

An alternative example embodiment of the pickup truck bed cover in accordance with the present invention, generally indicated by the numeral 10', is shown in FIG. 5. As shown in FIG. 5, the cover 10' is preferably rectangular and may measure approximately 3 to 5 inches tall, 4 to 8 feet long, and 4 to 5 feet wide to cover the bed of a pickup truck 12.

The cover 10' may be constructed of plastic, fiberglass, or aluminum to provide a rigid cover. As shown in FIG. 5, the cover 10' is preferably attractively styled to fit over the walls 14 and raised tailgate 16 of the pickup truck 12. In the closed position, the cover 10' conceals and protects contents transported inside the bed of the pickup truck 12.

As shown in FIG. 5, the cover 10' preferably has a slightly arched shape 18 that is visually appealing. The cover 10' may be offered in different colors to match or compliment the painted finishes of the pickup truck 12. The cover 10' may be used in both private and commercial pickup truck applications.

Unlike known covers, the cover 10' further comprises safety lighting. As shown in FIG. 5, the rear of the cover 10' preferably comprises amber turn signal lights 20A and 20B at the left and right sides, left and right hazard lights 22A and 22B, as well as a center red brake light(s) 24. The cover 10' may also comprise additional left and right backup lights 26A and 26B. These lights are preferably wired to the circuitry of the existing rear pickup truck lights utilizing, for example, a trailer hitch wiring harness commercially available from Hopkins Manufacturing Corporation, to provide elevated rear lighting for added safety. The cover 10' may also comprise a backup camera 28 which may be mounted to the cover or, as shown in FIG. 5, integrated in the housing of the brake light(s) 24.

As shown in FIG. 5, the cover 10' is removably mounted to the bed of the pickup truck 12 and comprises lockable elements such as conventional keyed cam locks 34 to removably secure the cover to the walls 14 of the bed of the pickup truck by inserting the cam portions into corresponding holes or slots 36 in the walls and turning the keys to lock the cover to the walls of the pickup truck to secure the contents within the bed of the pickup truck. For example, the cam locks 34 may be Series DC608 cam locks commercially available from Illinois Lock Company located in Wheeling, Ill. The trailer hitch wiring harness is then connected to the safety lighting preferably comprising the amber turn signal lights 20A and 20B at the left and right sides, left and right hazard lights 22A and 22B, the center red brake light(s) 24, and the left and right backup lights 26A and 26B utilizing the trailer hitch wiring harness. Additionally, the cover 10' may comprise the backup camera 28 and an alarm (not shown) to indicate unauthorized access to the bed of the pickup truck 12, for example, a Hopkins HM50002 smart hitch backup camera and hitch aligner system commercially available from Hopkins Manufacturing Corporation. The cover 10' may be removed by disconnecting the safety lighting and backup camera and alarm, unlocking the cam locks 34, and lifting the cover off the bed of the pickup truck.

With an additional rear brake light(s), turn signals, and hazard lights incorporated into the cover 10 or 10', other motorists may easily see the pickup truck 12 from behind, even at night in the snow, rain, or fog. This enhances safety and might even prevent a rear-end collision from occurring. Additionally, the cover 10 or 10' is weatherproof, secure, practical, and user-friendly.

The cover 10 or 10' may be produced using conventional and readily available materials and manufacturing processes. No new production technology is required. This protective bed covering could be produced of quality fiberglass with a marine-grade outer gel-coat finish. Another manufacturing option would be a very strong plastic such as vacuum-molded ABS or high-density polyethylene that includes ultraviolet (UV) inhibitors. Still another option would be the use of anodized aluminum for the protective cover 10 or 10'. Alternatively, other materials and manufacturing processes may be employed. Some of the components used in the construction, such as the safety lighting, insulated wiring, and any hardware, are readily commercially available from vendors for assembly.

The advantageous features of the cover 10' or 10' are its versatility, convenience, and attractive styling. Instead of using a conventional pickup truck bed covering, a colorful and stylish cover 10 or 10' is provided in accordance with the present invention. It would complement the pickup truck 12 in an attractive and eye-catching manner.

While the foregoing description has been with reference to particular example embodiments and contemplated alternative embodiments in accordance with the present invention, it will be appreciated by persons skilled in the art that changes in these embodiments may be made without departing from the principles and spirit of the invention. Accordingly, the scope of the present invention can only be ascertained with reference to the appended claims.

What is claimed is:

1. A truck bed cover comprising:
   a rigid cover having a first end and a second end to cover a bed of a cargo-carrying bed of a truck, wherein the cover is mounted to the bed; and
   safety lighting at the second end of the cover, wherein the second end of the cover is hingedly mounted to a rear end of the bed; the cover further comprises a backup camera, wherein the backup camera is integrated in a housing comprising a brake light incorporated at the second end of the cover.

2. The cover of claim 1 wherein the cover further comprises locks adapted to be removably mounted in slots provided in walls of the bed of the truck.

3. The cover of claim 1 wherein the safety lighting comprises turn signal lights.

4. The cover of claim 1 wherein the safety lighting comprises hazard lights.

5. The cover of claim 1 wherein the safety lighting comprises one or more brake lights.

6. The cover of claim 1 wherein the safety lighting comprises one or more backup lights.

7. The cover of claim 1, further comprising an alarm to indicate unauthorized access to the bed.

\* \* \* \* \*